Aug. 29, 1939.                C. WEDGE                    2,171,380
                    SAFETY DEVICE FOR AUTOMATIC BURNERS
                         Filed July 25, 1935          3 Sheets-Sheet 1

Patented Aug. 29, 1939

2,171,380

UNITED STATES PATENT OFFICE 2,171,380

SAFETY DEVICE FOR AUTOMATIC BURNERS

Cy Wedge, Houghton, Mich.

Application July 25, 1935, Serial No. 33,047

7 Claims. (Cl. 236—9)

The present invention relates generally to control means for automatic burners and the like, and is particularly concerned with the provision of control means for automatic stokers adapted to deliver solid fuel.

Automatic coal stokers for firing residential and commercial heating plants have come into wide use. One of the advantages of automatic coal firing is the low cost of the fuel used and the steady and uniform heat obtained, particularly where a power driven automatic underfeed stoker is provided for delivering fuel into the furnace at a rate controlled by either the temperature of the room or rooms to be heated or the temperature of the water or other heating medium by which the heat is transferred from the furnace to the space to be heated. Furnaces of different types may be used in automatic coal firing, such as hot air furnace, plants using hot water, steam, or a similar heating medium, and others.

The temperature control means for stokers employed in furnaces are usually so arranged that when the temperature of the heating medium, whether hot air, steam, water, or other means, rises to a predetermined value, the operation of the stoker is terminated, irrespective of the position of the room thermostat, even though the latter may call for heat. This is to prevent overheating the furnace and serves as a high limit control for the latter. Such a control thermostat is arranged also to start up the stoker when the temperature of the heating medium lies below said high limit, providing the room thermostat at that time calls for heat. Another instrument is usually included in the control means for stokers for the purpose of keeping fire in the furnace during times of low heat demand, as when outside temperatures are relatively high. Such instruments usually include clock mechanism of some character, arranged to periodically start up the stoker and keep the same in operation a short time so as to keep the fire alive at all times, even though there may be no call for heat for several days. It may happen, however, during such low heat demand that the automatic refueling mechanism may not keep the fire alive, or the fire in the furnace may become extinguished for other reasons. Thereupon the temperature of the water or other heating medium in the furnace descends, and the conventional thermostat unit serving as the high limit control will thus be thrown into a position to start up the stoker as soon as the room thermostat calls for heat. If, under these conditions, the room thermostat does call for heat, the stoker is started, but due to the fact that the fire in the furnace has become extinguished, the fresh coal delivered by the stoker to the furnace does not become ignited and no heat is therefore delivered to the heating medium. However, since the room thermostat and the high limit thermostat on the boiler both call for heat, the operation of the stoker continues to run for hours, or perhaps days, until either the supply of coal becomes exhausted, or the mass of coal forced into the furnace jams, or until the stoker is manually stopped by the person who discovers that the fire is out. Before the furnace can then be set into operation again, it is necessary that all of the fresh unburned coal forced into the furnace be removed.

There are also other conditions, similar to the conditions in which the fire goes out, in which the continued operation of the stoker is not desired but which is not controlled by the conventional thermostats associated with a furnace. For example, the supply of fuel in the hopper at the stoker may become exhausted, or the current energizing the stoker motor may be interrupted for a time, in both cases causing the fire to go out in the furnace. Also, in stokers of known construction, the coal is usually forced into the furnace by a worm, and sometimes a hard metal object, such as a bolt or nail, may be fed into the worm with the coal. Stokers are usually provided with a break pin which is adapted to be severed in such cases in order to protect the stoker motor and mechanism, and after the break pin is severed the stoker worm remains idle, so that no fuel is fed into the furnace, even though the motor continues to run and there is a supply of fuel in the hopper. Thus, the fire in the furnace will probably go out, but due to the positions of the furnace and room thermostats, both calling for heat, the stoker motor will continue to operate for an indefinite period unless the motor is shut off manually.

With these factors in view, the principal object of the present invention is the provision of an additional safety control, the function of which is to shut off the burner, such as a stoker or the like, when the fire has gone completely out, and it is another object of the present invention to arrange such safety or fire-out control with the conventional thermostats so as to work with the circuits including these instruments, but, at the same time, so as not to conflict with the instruments in their normal function. While the present invention finds its field of greatest usefulness in coal stokers and the like, it is not necessarily limited in its broad features thereto.

A further object of the present invention is the provision of an additional burner control arranged to shut off the delivery of fuel to or otherwise terminate the operation of the burner when the fire goes out and which performs its controlling function in response to a lowered temperature of the heating medium independently of the position of other control units. A thermostatic fire-out control unit made responsive to the temperature of the heating medium offers a number of advantages over the installation of such an instrument so as to be subjected to direct radiation from the fire. The thermostatic unit disposed in this position is subjected to excessively wide temperature changes and is, of course, subjected in the first instance, to excessively high temperatures. An instrument of this kind usually cannot be as accurate and dependable as an instrument arranged to be sensitive to the temperature of the heating medium.

Another object of the present invention is the provision of means associated with the fire-out control so as to provide, in effect, for temporarily removing the fire-out or safety control unit from the controlling thermostat circuits so as to be able to start up the fire and have it continue in operation until the temperature of the heating medium is brought up to the temperature below which the fire-out control normally serves to automatically cut off the burner. After the temperature of the heating medium has exceeded this point, the fire-out control can then be re-inserted into the controlling circuits and will then function in its normal way to protect the system against operation should the fire again become extinguished.

Still further, another object of the present invention is the provision of an instrument, incorporated in the usual thermostatic control means for an automatic stoker or other type of burner arranged to be subjected to the temperature of the water in a steam boiler so as to provide a safety control for the latter for shutting off the burner if the fire should go out, and also shutting off the burner if, for example, excessive supplies of raw cold water should be caused to enter the boiler, as may happen if the operator should forget to shut off the water supply valve when raising the water level in the boiler.

An additional object of the present invention is the provision of a safety control instrument for shutting off the burner when the temperature of the heating medium becomes so low as to indicate that the fire has become extinguished, in connection with a furnace or heating plant in which normally the temperature of the heating medium serves as the thermal control for the burner. For example, in some heating plants, the temperature of the heating medium controls the operation of the burner; that is, when the temperature of the heating medium reaches a certain point a temperature sensitive unit shuts off the burner and when the temperature of the heating medium descends to a slightly lower temperature, the unit starts up the burner. In this connection the present invention contemplates the addition of a second instrument also subjected to the temperature of the heating medium and connected with the burner and the first temperature sensitive unit so as to shut off the burner independently of the position of the first unit.

A further object of the present invention is the provision of control means for a coal stoker or other automatic burner which is particularly adapted for a steam heating system, whether fired by a coal stoker, oil burner, gas or other means, accommodating a pressure responsive unit for shutting off the operation of the burner when the pressure in the system exceeds a given point and embodying a high limit temperature responsive unit operating to cut off the burner when the temperature of the heating medium, independent of its pressure, becomes too high, in connection with a second temperature responsive unit set for a lower range than said first unit and connected to shut off the burner or fuel supplying means when the temperature of the heating medium reaches a predetermined low temperature. In control systems of this sort, the steam pressure regulator serves as a limit control for stopping the burner when a predetermined steam pressure is reached, independently of the temperature of the heating medium. In this way, the furnace may be operated for keeping the water in the boiler at any temperature, determined upon the setting of this instrument, thereby enabling the operation of a hot water heater by the heating system, and since the other temperature sensitive unit is set at a lower temperature, usually approximately 20° below the setting of the first instrument, if the fire in the burner should go out, when the hot water temperature responsive unit acts to start the burner, by reason of the lowering temperature of the heating medium due to the fact that the fire is out, the other temperature sensitive unit or fire-out control will stop the stoker if the lower temperature is reached.

While I have illustrated my invention as embodied in what is termed a low voltage control system, it will be apparent to those skilled in the art that the principles of my invention may be employed in high voltage systems embodying control units operating under line voltage. Also, while the present invention is peculiarly applicable to heating systems using coal or other solid fuel, it is to be understood that in its broader aspects, the present invention may be employed with any type of fuel for any type of burner.

These and other objects and advantages of the present invention will be apparent to those skilled in the art after a consideration of the following detailed description of the preferred form of the present invention, taken in conjunction with the accompanying drawings illustrating such embodiments.

Figure 1:
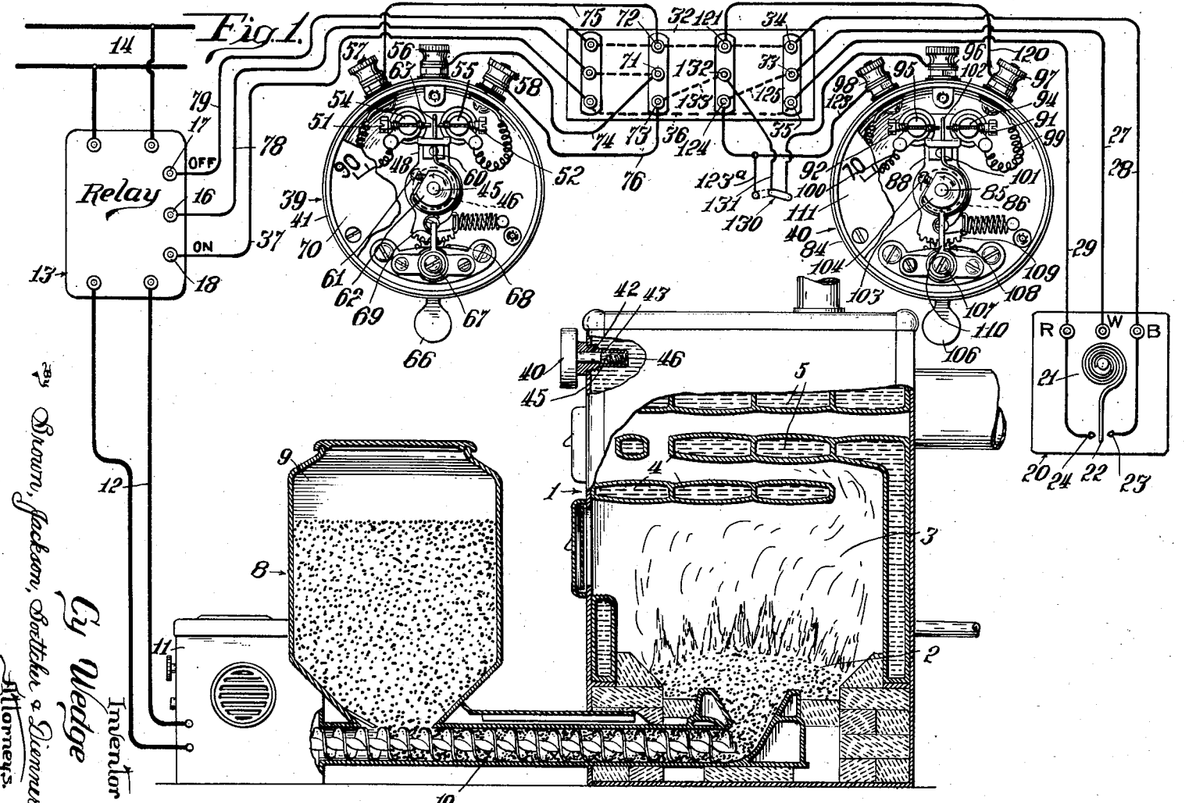
Figure 1 is a view, partly schematic, illustrating one form of the present invention embodied in a heating plant of the hot water type and employing a room thermostat and regulating or limiting thermostat.

Referring now particularly to Figure 1, the reference numeral 1 indicates a furnace of the hot water type including a fire pot 2 enclosing a combustion space 3 and water jackets 4 through which flows the heating medium 5, usually water, which absorbs heat from the combustion of the coal or other solid fuel in the combustion space 3. The stoker unit is indicated by the reference numeral 8 and includes a hopper 9 having an open lower end which delivers coal to a stoker worm 10, the latter serving to force the coal up into the hopper 2 in the usual manner. The motor for driving the worm 10 and blowing air into the combustion zone 3 is enclosed within a housing 11 and is energized by suitable connections with a source of power, which connections include a pair of leads 12 and a relay switch mechanism 13 of conventional construction connected with the line 14. The relay switch mechanism includes terminals 16, 17 and 18 which are connected, respectively, with suitable thermostats and other instruments forming a part of the conventional low voltage three-wire circuit controlling means. The control of the stoker is obtained through the suitable control instruments by electrically connecting the terminals 16 and 17 when it is desired to shut off the stoker and electrically connecting the terminals 16 and 18, when it is desired to start up the stoker.

One of the instruments forming a part of the control means and connected with the relay terminals 16, 17 and 18, is a room thermostat 20 shown more or less diagrammatically in Figure 1 as including a thermostatic element 21 responsive to the temperature in the room or space to be heated and carrying a movable switch blade 22 having one side engageable with a contact element 23 and the other side engageable with a second contact 24. Suitable leads 27, 28 and 29 are connected with the thermostat 21 and the contacts 23 and 24. One side of the thermostat blade 22 in conjunction with the contact 23 serves as one pair of contacts adapted at a given temperature to connect the conductors 27 and 28, and the other side of the thermostat blade 22 and the part 24 constitute a second pair of contacts adapted to connect the conductors 27 and 29. The control system also includes a terminal block 32 having terminals or binding posts 33, 34 and 35 to which the conductors 27, 28 and 29 are respectively connected. If desired, of course, the connections may be made in any other way. The terminal 35 on terminal block 32 is connected through a jumper 36 and a conductor 37 with the relay terminal 18. The connection 36 is usually disposed on the back of the terminal block.

The furnace instruments, shown on an enlarged scale in Figure 1 as compared with the furnace 1 on which they are mounted, includes a first temperature sensitive unit 39 and a second temperature sensitive unit 40, both responsive to the temperature of the water or other heating medium 5 in the furnace. Usually both instruments are arranged side by side on the face of the furnace 1, substantially as shown at small scale in Figure 1, but in order to show the instruments 39 and 40 in more detail, they are shown enlarged and in full lines with the associated circuit connections. So far as the present invention is concerned, these instruments may be alike. Each of the units consists of an instrument casing having a sleeve or shank 42 mounted in a well 43 threaded into the wall of the furnace and in thermal contact with the heat transfer medium therein. The neck or shank 42 is apertured to receive a shaft 45 on the inner end of which a thermostat element 46 is mounted, one end thereof being fastened to the shaft and the other being secured to the sleeve or neck 42 of the instrument casing 41. Since the element 46 is thermostatic, the shaft 45 is rotated in response to temperature changes of the heating medium 5.

Referring first to the unit 39 shown in full lines at an enlarged scale as compared with the furnace, a contact supporting plate 48 is mounted for limited rocking movement about the axis of the shaft 45 within the casing 41 and at its upper end carries laterally spaced contact screws 51 and 52 adjustably carried, respectively, in studs 54 and 55 secured in insulated relation to and carried by the contact supporting member 48. Flexible leads, accommodating movement of the member 48, extend from the contact supporting studs 54 and 55 to terminal post 57 and 58, respectively, carried by but insulated from the casing 41. A central terminal post 56 is grounded to the instrument case 41. A resilient switch blade 60 is fastened, as by screw 61, to a collar 62 secured to the shaft 45 and is thereby in electrical connection with the grounded terminal 56. The outer or movable end 63 of the switch blade 60 is adapted to have one side engage the contact screw 51 and the other face is adapted to engage the contact screw 52.

As in the case of the room thermostat described above, one side of the switch blade and the contact screw 51 serve as one pair of contacts arranged, when in engagement, to connect the terminals 56 and 57, and the other side of the switch blade 60 and the other contact screw 52 serve as a second pair of contacts arranged to connect the terminals 56 and 58.

The instrument case 41 includes adjusting lever 66 pivoted, as at 67, and provided with gear teeth 68 engaging gear teeth on the lower end of the movable contact carrying member 48. Swinging the lever 66 adjusts the member 48, and the contacts 51 and 52 carried thereby, relative to the thermostat shaft 45 and the switch blade 60 carried by the shaft, the part 48 being movable with respect to the shaft 45 and the member 60. Movable with the lever 66 is a hand 69 operating over a dial 70 to indicate the temperature setting of the unit. The terminal block 32 is provided with a set of three terminals 71, 72 and 73 connected respectively by leads 74, 75 and 76, with the instrument terminals 56, 57 and 58, and the terminal block binding posts 71 and 72 are connected with the relay terminals 16 and 17 by conductors 78 and 79, respectively.

The thermostatic regulator and limit control instrument 39, with its thermostat element 46 in thermal contact with the heating medium 5 in the furnace 1, is usually arranged in such a manner that when the temperature of the heating medium is above a given value, usually adjustable from 90° F. to 250° F., depending upon the setting of the lever 66 and the associated plate 48 geared thereto, the contacts 51 and 63 are in engagement, thereby connecting the relay terminals 16 and 17 and providing for shutting off the stoker when the other mentioned limit is exceeded. This prevents overheating the furnace 1, entirely independent of any setting of the room thermostat 20. At heating medium temperatures below the above mentioned limit, the other pair of contacts 52 and 63 are in engagement, providing for the electrical connection of the relay terminals 16 and 18, as will be described later, and permitting the room temperature 20 to start up the stoker whenever room temperature causes the pair of contacts 24 and 22 of the room thermostat to move into engagement.

The third controlling instrument in the form shown in Figure 1 includes a fire-out control or safety thermostat consisting of the unit referred to above in its entirety by the reference numeral 40. As seen from Figure 1, the instrument 40 is substantially identical, for all practical purposes, with the instrument 39 just described. Of course, the identity of these two instruments is not essential to the principles of the present invention. The instrument 40 includes a casing 84 in which is journaled a shaft 85 carrying a thermal responsive element in the form of a thermostat 86. Mounted for rocking movement in the casing 84 is a shiftable adjusting plate member 88 mounted for pivotal movement about the axis of the thermostat shaft 85 and carrying two spaced contact screws 91 and 92 mounted for adjustment in studs 94 and 95 carried, like the studs 54 and 55 described above, in insulated relation with respect to the shiftable plate 88. A central or intermediate terminal 96 is grounded to the plate and is disposed between two other terminals 97 and 98 connected, respectively, by suitable flexible leads 99 and 100 with the studs 94 and 95. A switch blade 101 having a contact end 102 is carried upon a collar 103, being fixed thereto by means of a screw 104 or the like and is thereby movable when the thermostat 86 rotates the shaft 85. By virtue of its connection with the shaft 85, the switch blade 101 is grounded through the casing 84 with the terminal 96. In order to electrically separate the terminals 56 and 96 it is desirable to insulate the casing 84 from the furnace, or the terminal 96 might be insulated with respect to the casing and the switch blade 60 also insulated and connected with the terminal 56 if desired. The instrument 40 is provided with an adjusting lever 106 pivoted at 107 to the casing 84 and provided with gear teeth 108 engaging with gear teeth 109 formed on the lower end of the shiftable adjusting plate 88. The lever 106 carries an indicating hand 110 movable over a dial 111 to indicate the setting of the unit. Swinging the lever 106 in one direction or the other changes the position of the plate 88 with respect to the shaft 85, thereby raising or lowering the limits at which the switch blade 101 makes contact either with the screw 91 or the screw 92.

A conductor 120 is arranged to connect the terminal post 97, and the contact screws 91 associated therewith, with a binding post 121 carried by the terminal block 32 and connected through suitable jumpers on the back of the block with the terminal posts 34 and 72. Being connected in this manner, the conductor 120 is thereby connected with the conductor 28 leading to the room thermostat 20 and the conductor 79 leading to the relay terminal 17. A conductor 123 serves to connect the terminal 98 of the fire-out control instrument with a terminal 124 carried by the terminal block 32, and according to the present invention a short conductor or jumper 125 serves to connect the terminal 124 with the terminal 33, thereby placing the instrument terminal 98, and the associated contact screw 92, in connection with the conductor 27 leading to the room thermostat 20. The intermediate terminal 96 of the fire-out control instrument 40 is connected by means of a manually operated starting switch 130 and a conductor 131 with a binding post 132 disposed on the terminal block 32 between the binding posts or terminals 121 and 124, and the terminal 132 is connected by means of a jumper 133 with the terminal block binding post 73 and, through conductor 76, with the terminal 58 of the high limit control instrument 39. The switch 130 is normally in the full line position shown in Figure 1.

With the controlling means arranged in the manner just described, the stoker is governed as follows. The fire-out control instrument 40 serves primarily as a safety instrument for shutting off the stoker whenever the temperature of the heating medium in the furnace 1 falls to a given or predetermined low value. The value can be adjusted by swinging the lever 106, in the same manner described above in connection with the instrument 39, but the range of adjustment of the instrument 39 should be below that of the instrument 40. Usually, the instrument 40 is arranged to close the contacts 94 and 102 whenever the temperature of the heating medium 5 falls to some point, say in the neighborhood of 85° F. or lower, depending upon the adjustment of the shiftable plate 88. When the temperature of the heating medium is a few degrees higher, depending upon the differential of the implement 40, the other pair of contacts, comprising elements 102 and 92, are in engagement, and they remain in engagement at all times during all normal operations of the heating plant. The instrument 39 is usually adjusted partly in accordance with the outside temperature, the setting being increased when the outside temperature is low, and vice versa. Usually, as stated, the instrument 39 is never set below 90° F. and is always higher than the setting of the instrument 40.

The control means described above operates substantially in the following manner. Assuming that the furnace has already been placed in operation and the temperature of the heating medium 5 in the furnace 1 is above the setting of the instrument 40, which acts as a fire-out control and shuts off the stoker when the water temperature falls to 80° or 85°, or lower, and below the setting of the instrument 39, which acts as a high limit control and shuts off the stoker when the water temperature gets too high. In this case, the contacts 102 and 92 will be in engagement and the contacts 52 and 63 will be in engagement. Assuming also a room temperature within the differential range of the room thermostat 20, the switch blade 22 thereof will be floating between the contacts 23 and 24 thereof but not in engagement with either of them. As the stoker continues to operate in the normal manner, the temperature of the room will be increased to such point at which the switch blade 22 will engage contact 23. Since the contacts 92 and 102 are in engagement, the switch 130 closed in its full line position and the contacts 52 and 63 are in engagement, the stoker will be shut off by the connection of relay terminals 16 and 17 when the switch blade 22 touches the contact 23. After the stoker has been shut off for some time, by the temperature of the room reaching its upper limit and the engagement of the switch blade 22 with contact 23 effecting the deenergization of the stoker in the manner set forth above, the temperature of the room descends and the switch blade 22 will then move to the left as viewed in Figure 1 until a temperature is reached at which the switch blade 22 will leave the contact 23 and will engage the contact 24. As soon as this pair of contacts are thus brought into engagement a connection is established between relay terminals 16 and 18. The circuit from relay terminal 18 to the intermediate relay thermal 16 is completed through conductor 37, conductor 36, terminal or binding post 35, conductor 29, contacts 24 and 22, conductor 27, terminal post 33, jumper 125, terminal 124, conductor 123, terminal 98, lead 100, contact 92, switch blade 102, terminal 96, switch 130, conductor 131, terminal 132, jumper 133, terminal 73, conductor 76, terminal 58, contact screw 52, switch blade 63, terminal 56, conductor 74, terminal 71, and conductor 78.

It is to be noted at this point that the starting up or energization of the stoker is dependent not only upon the engagement of the pair of contacts 22 and 24, but also the contacts 92 and 102, and 52 and 63. If either of these pairs of contacts is open, the stoker cannot be started up, even if the room thermostat calls for heat. Under normal operation, however, the stoker would continue to operate, the coal fed thereby into the furnace becoming ignited by the fire already burning in the furnace 1, until the temperature in the room has been raised to a point at which the switch blade or thermostat blade 22 leaves the contact 24 and engages the contact 23, thereby shutting off the stoker in the manner set forth above.

However, during the time that the stoker is in operation with the room thermostat blade 22 in engagement with contact 24 or before it has returned to engagement with contact 23, the temperature of the heating medium in the furnace 1 may descend, instead of ascending, as in normal operation. For example, if the stoker 1 was started but there was no fire in the furnace, naturally the temperature of the heating medium would continue to descend, or if the stoker hopper became exhausted of fuel and for this reason the fire became extinguished, or if an obstruction became caught in the stoker and the stoker thereby thrown out of operation so that no fuel would be forced into the fire pot, the fire becoming extinguished in this case, the temperature of the heating medium would not be increased but would, on the contrary, decrease. The continued decrease in temperature of the heating medium would finally cause the instrument 40, responsive thereto, to swing the blade 101 carrying the contact 102 out of engagement with the contact 92 and, at some temperature below the range of temperature of the furnace regulator or high limit instrument 39, would cause the switch blade 101 to swing the contact 102 into engagement with the contact 91. As soon as this occurs, the terminals 121 and 122 in the terminal block 32 are directly connected together and the relay terminals 16 and 17 are connected through a circuit which comprises the following: from relay terminal 17 through conductor 79, terminal block binding post 121, conductor 120, terminal 97, contacts 91 and 102, terminal 96, switch 130, conductor 131, binding post 132, jumper 133, terminal 73, conductor 76, binding post 56, contacts 52 and 63 (these contacts always being in engagement below the upper limit of the instrument 39), terminal post 56, conductor 74, terminal 71, and conductor 78 to the relay terminal 16. Thus, even though the room thermostat 20 calls for heat by having its switch blade 22 in engagement with contact 24, the movement of the fire-out control blade 101 away from the contact 92 interrupts the circuit through which the stoker was energized in the first place and the swinging of the contact 102 into engagement with the contact 91 immediately acts through the engaged contacts 52 and 63 (these contacts being held in firm engagement by the fact that the temperature of the heating medium is well below the setting of the high limit control unit 39) to immediately shut off the stoker by connecting the relay terminals 16 and 17.

Thus, in a three wire system employing a room thermostat and a high limit control, operating normally to prevent the furnace from being brought to excessive high temperatures, I have provided additional means operating through the same circuits, but entirely independent of the room thermostat and furnace regulator units, to immediately shut off the stoker when the temperature of the heating medium falls to some point below the high limit setting of the furnace regulator unit, so as to prevent operating the stoker when there is no fire in the furnace, even though both the room temperature and the furnace regulator calls for heat.

After the stoker has been shut off in this manner and the temperature of the heating medium has fallen to some point below the temperature setting of the fire-out control instrument 40, it is necessary to cut the last named instrument out of operation temporarily in order to start up the heating plant, for the temperature of the heating medium being low, the cut-off contacts 91 and 102 will be in engagement and would otherwise operate to shut off the stoker. In order to temporarily prevent the fire-out control instrument from operating in its normal manner I provide the switch 130. By changing the same from its full line position to the dotted line position, in which position the connector 131 is connected through the switch 130 and the auxiliary connector 123a with the conductor 123, in effect, I shunt the contacts 92 and 102 and thereby connect the room thermostat conductor 27 with the conductor 76 of the furnace regulator high limit switch 39. Thus, with the fire out and the heating medium in the furnace cold, the room thermostat contacts 22 and 24 will be in engagement, as will be contacts 63 and 52 of the limit control unit 39, as soon as the switch 130 is swung from its full line position under the conditions assumed into its dotted line position, the stoker will be started up and will continue in operation until the heating plant has been placed in normal condition. It is necessary to leave the switch 130 in its starting or dotted line position only so long as the temperature of the heating medium lies below the setting of the fire-out control unit 40. As soon as the temperature of the heating medium has passed this setting, the contacts 92 and 102 will be brought into engagement thereby connecting the conductors 123 and 131. Then the manual switch 130 can be thrown back to its full line position to thereby place the fire-out control unit 40 in a condition to again shut off the stoker if the temperature of the heating medium should fall to a low point indicating that the fire is out.

Figure 2:
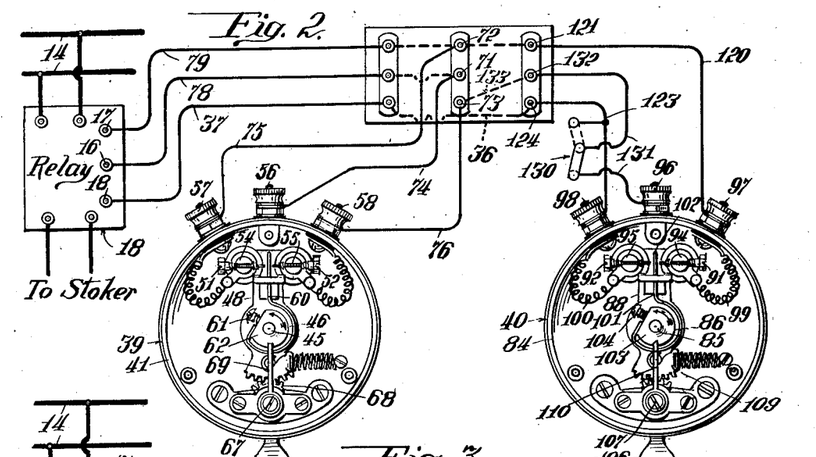
Figures 2 to 4, inclusive, are modified forms embodying the principles of the present invention.

In some systems of control, no room thermostat connected directly with the furnace controls is employed. Instead, the high limit or upper limit switch mechanism 39 is employed for the purpose of keeping the temperature of the heating medium substantially constant, other means being provided for governing under thermostatic control the flow of heating medium to the space or spaces to be heated. In heating systems of this kind, employing no room thermostat but utilizing a high limit furnace regulator, my fire-out control may be incorporated in the circuit connected by merely connecting the terminal 124 with the conductor 36, the binding posts 33, 34 and 35 and the room thermostat 20 illustrated in Figure 1 being entirely eliminated. Figure 2 illustrates a circuit arranged in this manner, and since the same parts shown in Figure 1 are employed, the same reference numerals have been used in Figure 2. A reference to this figure will show that the instrument 39 normally operates to shut off the stoker by connecting the relay terminals 16 and 17 whenever the temperature of the heating medium rises to a given value, and the fire-out control normally operating to cut off the stoker whenever the temperature of the heating medium descends to a value below the setting of the instrument 40. In Figure 2, and in Figure 1 as well, the arrows on the collars 62 and 103 indicate the direction of movement of the shafts 45 and 85, and the spring arms 60 and 101, under a temperature increase.

Figure 3:
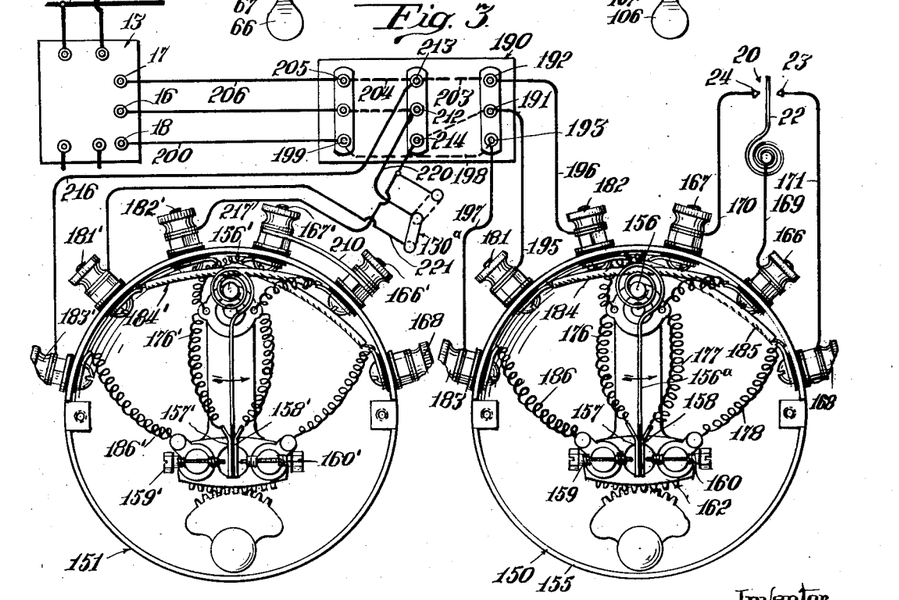

In Figure 3 I show an arrangement for performing substantially the same function as the arrangement shown in Figure 1, but by the use of six-terminal instruments I eliminate the necessity for an extended terminal block, such as the one shown in Figure 1 at 32. Referring now more particularly to Figure 3, the instruments 150 and 151 are substantially identical and are obtainable in the open market. The instrument 150 is arranged to shut off the stoker whenever the temperature of the heating medium becomes excessive, and the instrument 151 serves as a fire-out safety control for shutting off the stoker whenever the water temperature descends to a predetermined minimum, indicating that the fire in the furnace has become extinguished.

The instrument 150, shown somewhat diagrammatically in Figure 3, embodies a casing 155 which supports for movement therein a thermostat 156 disposed in thermal relation with respect to the heating medium in the furnace 1, and the thermostat 156 carries in insulated relation a pair of contacts 157 and 158, the contacts being movable with the thermostat 156 through a spring arm 156a. Cooperating with the contacts 157 and 158 are contacts 159 and 160 carried for manual adjustment upon an adjustable plate 162 in insulated relation. The instrument case 155 carries two sets of three terminals or binding posts. The first set includes terminals or binding posts 166, 167 and 168 and are connected through suitable conductors 169, 170 and 171 with the thermostat blade 22 of the room thermostat 20 and the contacts 23 and 24 thereof. The thermostat contact 157 is connected with the terminal 167 through a flexible lead 176, and a flexible lead 177 connects the other thermostat contact 158 with the terminal 166. A third flexible conductor 178 serves to connect the terminal or binding post 168 with the other shiftable or adjustable contact 160. The other set of three terminals or binding posts is indicated at 181, 182 and 183 connected, respectively, with the binding posts 166 and 168 and the other shiftable contact 159, leads 184, 185 and 186 being employed respectively for this purpose and the conductor or lead 186 being flexible to accommodate movement of the contact 159 and the plate 162 supporting it.

A terminal block 190 carries three binding posts 191, 192 and 193 which are connected, respectively, by means of conductors 195, 196 and 197 with the instrument terminals 181, 182 and 183. A jumper 198 leads to a terminal binding post 199 carried at the opposite end of the terminal block 190 and connected by means of a conductor 200 with the terminal or binding post 18 on the relay 13. The terminal block binding post 192 is connected by means of jumpers 203 and 204 with another binding post 205 at the opposite end of the terminal block 190, and the latter is connected by means of a conductor 206 with the relay terminal 17.

The instrument 151 is substantially identical structurally with the instrument 150, and for that reason the same reference numerals, except that they are primed, are shown in connection with the instrument 151. The terminals 166' and 167' are connected by means of a jumper 210.

The terminal block 190 is provided with an intermediate set of three binding posts 212, 213 and 214, terminals 213 and 214 being connected, respectively, with the binding posts 183' and 182' by means of conductors 216 and 217. The intermediate terminal block binding post 212 is connected by means of a starting switch 130a and conductor sections 220 and 221 with the instrument terminal binding post 181'.

When the instruments are arranged as indicated in Figure 3, the thermostats 156 and 156' being in thermal relation with respect to the heating medium in the boiler or furnace 1, the stoker is turned off if the thermostat 156' of the instrument 151 is moved to its low temperature position, contacts 157' and 159' being in engagement. The stoker is also shut off if the thermostat 156 of the high limit instrument 150 is moved to its high temperature position, which brings the contacts 158 and 160 into engagement, or if the room thermostat 20 is moved into its high temperature position with the contacts 22 and 23 in engagement. However, the stoker cannot be started up unless both the room thermostat 20 and the high limit instrument 150 are in their low temperature positions and, in addition, the fire-out safety instrument 151 must be in its high temperature position. For example, if the fire should become extinguished, as for any reason such as one of those mentioned above, the contact 157' will move into engagement with the contact 159', thereby closing the circuit between the relay terminals 16 and 17 through terminal block binding post 212, conductor sections 220 and 221, conductor 184', jumper 210, conductor 176', contacts 157' and 159', conductor 186', conductor 216, terminal block binding post 213, and conductors 204 and 206. In a similar manner, if the temperature of the heating medium should become excessive, closing of the contacts 158 and 160 in high limit instrument 150, or closing of the room thermostat contacts 22 and 23, will electrically connect relay terminals 16 and 17 and shut off the stoker. However, if the room thermostat 20 should call for heat and the room thermostat contacts 22 and 24 move into engagement, a connection between relay terminals 16 and 18 is not completed unless both pairs of contacts 157 and 159 (instrument 150) and contacts 158' and 160' (instrument 151) are in engagement.

Figure 4:
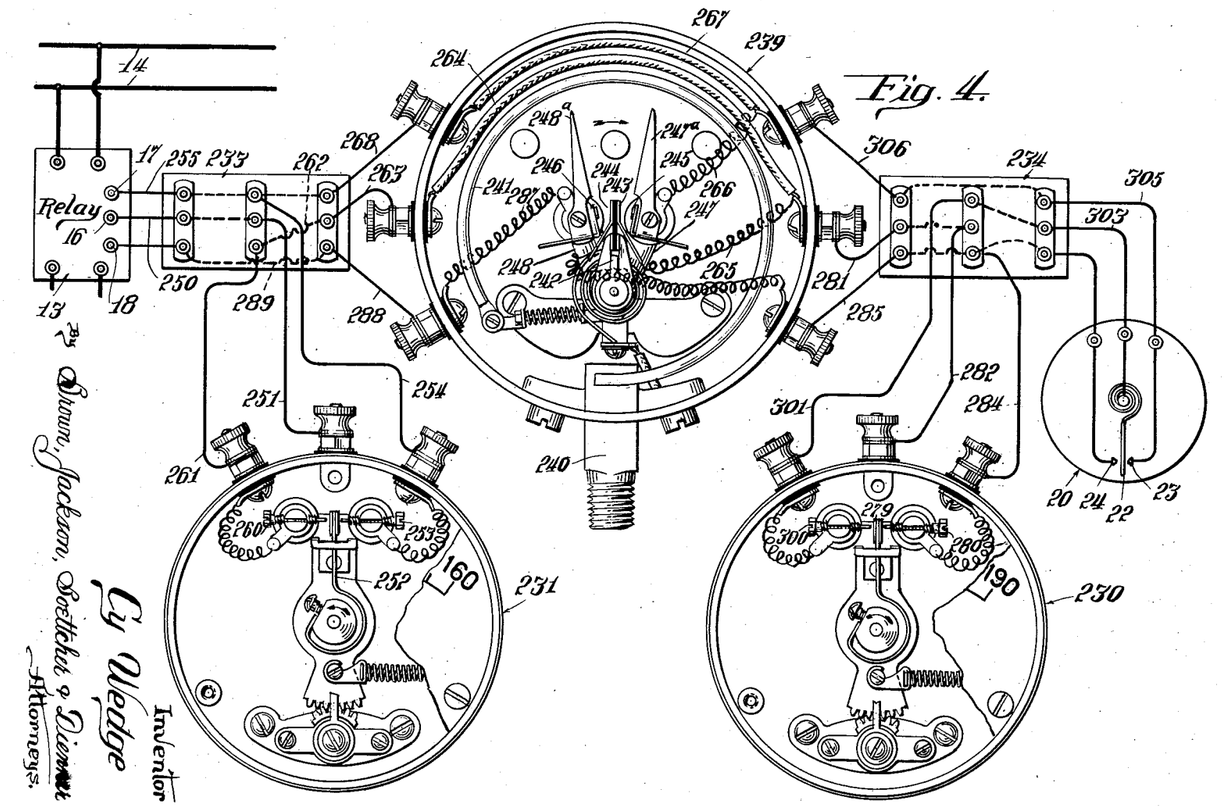

In Figure 4 I have shown a somewhat different arrangement, embodying two three terminal instruments 230 and 231, such as instruments 39 and 40 shown in Figure 1, and in addition a steam pressure regulator having a part movable in response to the pressure of the heat transfer medium in the furnace 1. Since in Figure 4, the two instruments 230 and 231, responsive to the temperature of the heating medium are substantially the same as the instruments 39 and 40 described above, so far as their internal construction is concerned, a detailed description is not necessary. However, where the instrument 39 serves as a high limit control, shutting off the stoker when the temperature of the heating means exceeds a predetermined maximum, the instrument 230 serves to keep the temperature of the heating means up to or above a certain maximum, usually around 170° F., for the purpose of maintaining a supply of hot water. The room thermostat employed is the same as in Figure 1, and has therefore been indicated by the same reference numeral 20.

Two terminal blocks 233 and 234 are employed, and between them there is connected a steam pressure regulator 239 of more or less conventional construction so far as its mechanical features are concerned. The steam pressure regulator is provided with a nipple 240 adapted to communicate with the steam pressure in the boiler 1 and is provided with means, such as a Bourdon tube 241, which is connected with a swinging arm 242 carrying two insulated contacts 243 and 244, adapted to engage, respectively, two adjustably fixed contacts 245 and 246. These contacts may be mounted for separate adjustment upon shiftable plates 247 and 248 so as to provide for adjusting the pressure differential range of the steam pressure regulator 239. Secured to the plates 247 and 248 are pointers 247a and 248a.

The instrument 239 is connected with the relay 13, the room thermostat 20, and the hot water regulator and fire-out control instruments 230 and 231, in such a manner that when the pressure in the furnace 1 exceeds a predetermined value the arm 242 swings and carries the contact 243 into contact with the contact 245 to automatically shut off the stoker, independently of the position of either of the other instruments, 20, 230 or 231. The steam pressure regulator 239 therefore serves as a pressure limit control and will stop the stoker when the predetermined steam pressure, usually in the nature of two pounds in house heating systems, is reached, even before the room thermostat acts. Similarly, when the temperature of the heating medium falls below the setting of the instrument 231 the stoker is also shut off, entirely independently of the setting of any of the other instruments 20, 230, or 239. Also, if the temperature in the room or space to be heated exceeds the upper differential limit of the room thermostat 30, the stoker is also automatically cut out, independently of the position of the other instruments.

For example, if the fire in the boiler or furnace should go out and the temperature of the heating medium descend to a point at or below the setting of the instrument 231, usually around 150° F., a connection between the relay terminals 16 and 17 is established through the conductors 250 and 251, the shiftable thermostat blade 252, the low temperature contact 253, conductor 254, and conductor 255. Moreover, if the steam pressure regulator should respond to a high pressure in the steam space of the furnace 1, the engagement of the contacts 243 and 245 will close a circuit between the relay terminals 16 and 17 through the conductor 250, the thermostat blade 252 of instrument 231, the high temperature contact 260, conductors 261, 262 and 263, connections 264 and 265 forming a part of the steam regulator wiring, contacts 243 and 245, and conductors 266, 267, 268 and 255.

Reference above was made to the fact that the instrument 230 is arranged in Figure 4 to act as a control for maintaining the heating medium up to a given temperature, usually around 170° F. The regulator 230 is connected so that when the temperature of the medium is below the setting of the instrument, contacts 279 and 280 are in engagement and completes a circuit from terminal 16 of the relay instrument 13, through the engaged contacts 252 and 260 of the fire-out control instrument (these contacts being normally in engagement due to the fact that the temperature of the heating medium is normally above the setting of this instrument), conductors 261, 262, 263, 264, 281 and 282, the engaged contacts 279 and 280, conductors 284 and 285, the pressure regulator contacts 244 and 246, conductors 287, 288 and 289, to the starting terminal 18 of the relay unit 13. Thus, the hot water regulator 230 can start up the stoker independently of the room thermostat 20, providing the steam pressure is below the setting of the pressure regulator 239 and the temperature of the heating means above the setting of the fire-out control instrument 231. When the temperature of the water reaches the setting of the instrument 230, the closing of the contacts 279 and 300 will close a circuit from relay terminal 16 through conductor 250, contacts 252 and 260, conductors 262, 263, 264, 281 and 282, contacts 279 and 300, conductors 301 and 303, room thermostat contacts 22 and 23, and conductors 305, 306, 267, 268 and 255, to the relay stopping terminal 17. It is to be noted that for the hot water regulator 230 to stop the stoker it is necessary that the room thermostat be in its off position. In other words, the hot water regulator 230 is arranged to start up the stoker or other burner, providing the fire-out control instrument 231 is in its high temperature position and the steam pressure regulator 239 is in its low pressure position, independently of the room thermostat 20, but if the temperature of the water or other heating medium to which the instrument 230 is responsive is above the setting of the instrument, the control is then shifted back to the room thermostat 20, engagement of the contacts 22 and 23 shutting off the burner and engagement of the contacts 21 and 24 starting up the burner.

Briefly, then, Figure 4 discloses an arrangement of control means including an instrument responsive to pressure for shutting off the stoker or other burner when the pressure exceeds a predetermined maximum, this instrument in effect serving as a high temperature limit instrument since pressure and temperature are interrelated, a second instrument also responsive to the temperature of the heating medium and arranged at a lower setting than the equivalent setting of the first instrument and operative to shut off the stoker or other burner when the temperature of the heating medium falls to or below a predetermined minimum, which minimum is so selected as to indicate that the fire in the stoker or other burner has become extinguished, in connection with a room thermostat and a third instrument, also responsive to the temperature of the heating medium and arranged to maintain the stoker or other burner in operation so as to keep the temperature of the heating medium somewhere near a constant value intermediate the equivalent settings of the first two instruments and arranged to either control the stoker or other burner for causing the same to operate independently of the position of the room thermostat or to relinquish control to the room thermostat. This arrangement of control instruments is particularly arranged for steam heating systems, employing any kind of burner and operable in a manner so as to maintain a constant supply of hot water for the purpose of delivering heat to a hot water tank. An arrangement of this sort utilizes the regular heating system for heating hot water for domestic purposes even during the summer months.

It is to be noted that in Figure 4 no cut-out switch has been illustrated as associated with the fire-out control instrument. A cut-out is not necessary in many installations, particularly those in which the fire-out control instrument includes an adjustment which can be turned down temporarily to a low temperature position, sufficiently low to permit the stoker or burner to start up even though the fire has become extinguished and the temperature of the heat transfer medium fallen. After the heating plant has been started up and in normal operation, the fire-out control instrument may then be turned back to its normal operating position. This applies, not only to Figure 4, but also to the other modifications described above.

While I have shown and described above the preferred forms of my invention, it is to be understood that my invention is not to be limited to the particular details shown and described above, but that, in fact, widely different means may be employed in practicing the broader aspects of my invention.

What I claim, therefore, and desire to secure by Letters Patent is:

1. Control means for an automatic coal stoker for furnaces and the like having a medium heated by combustion of the coal fed to the furnace, said control means comprising a room thermostat, energizing means for actuating the stoker including a relay having three terminals and associated conductors, said relay being so arranged that shorting the first and third conductors energizes the stoker and shorting the first and second conductors deenergizes the stoker, a first temperature sensitive unit responsive to the temperature of said medium and including means serving as two pairs of contacts, said pairs of contacts including a first pair directly connected with said first and second relay conductors, respectively, whereby when the temperature of said medium reaches a certain predetermined high value said relay is actuated to deenergize said stoker, said room thermostat including means serving as two pairs of contacts, the first pair of contacts thereof being connected to short said first and second relay conductors through the second pair of contacts of said first temperature sensitive unit, whereby said room thermostat serves to deenergize said stoker when said first pair of room thermostat contacts are engaged, providing the stoker has not previously been deenergized by the engagement of the first pair of contacts of said temperature sensitive unit, the second pair of room thermostat contacts being connected with the first and third relay conductors through said second pair of contacts of the first temperature sensitive unit, whereby said relay is actuated to energize the stoker only when the second pair of said room thermostat contacts and said second pair of contacts of the temperature sensitive unit are engaged, and a second temperature sensitive unit also responsive to the temperature of the medium heated by said furnace, said second temperature sensitive unit also including means serving as two pairs of contacts, the first pair of contacts being disposed in series with the second pair of room thermostat contacts and said second pair of contacts of said first temperature sensitive means, whereby neither the room thermostat nor said first temperature sensitive means can actuate said relay to energize said stoker unless the first pair of contacts of said second temperature sensitive unit are in engagement, the second pair of contacts of the second temperature sensitive unit being arranged in series with said second pair of contacts of the first temperature sensitive unit to connect said first and second relay conductors to deenergize said stoker independently of the position of either of the pairs of contacts of the room thermostat.

2. Control means for an automatic burner for furnaces and the like having a medium heated by combustion of the fuel fed to the furnace, said control means comprising energizing means for actuating the burner, a temperature sensitive unit responsive to the temperature of said medium and including means serving as two pairs of contacts, the engagement of one pair serving to start up said energizing means and the engagement of the other pair serving to deenergize said means to stop the delivery of fuel to the furnace, said first pair of contacts being adapted to be engaged when the temperature of said medium falls to a given value and said second pair of contacts being brought into engagement when the temperature of said medium rises to a given value, and a second temperature sensitive unit responsive to the temperature of said medium and also including two pairs of contacts, the first pair of contacts thereof being disposed in serial arrangement with said first pair of contacts of said first temperature sensitive unit, whereby said burner is not energized unless both of said first pairs of contacts are in engagement, said second temperature sensitive unit being arranged to bring said first pair of contacts thereof into engagement when the temperature of said heating medium is above a given value lower than said first mentioned lower temperature value, the second pair of contacts of said second temperature sensitive unit being brought into engagement when the temperature falls below said lower value and arranged to deenergize said burner independent of the engagement or non-engagement of said second pair of contacts of said first temperature sensitive unit.

3. Control means for an automatic coal stoker for furnaces and the like having a medium heated by combustion of the coal fed to the furnace, said control means comprising a room thermostat, energizing means for actuating the stoker including a relay having three terminals and associated conductors, said relay being so arranged that shorting the first and third conductors energizes the stoker and shorting the first and second conductors deenergizes the stoker, a first temperature sensitive unit responsive to the temperature of said medium and including means serving as two pairs of contacts, said pairs of contacts including a first pair so connected with said first and second relay conductors, respectively, that when the temperature of said medium reaches a certain predetermined high value said relay is actuated to deenergize said stoker, said room thermostat including means serving as two pairs of contacts, the first pair of contacts thereof being connected to short said first and second relay conductors whereby said room thermostat serves to deenergize said stoker when said first pair of room thermostat contacts are engaged, the second pair of room thermostat contacts being connected with the first and third relay conductors through said second pair of contacts of the first temperature sensitive unit, whereby said relay is actuated to energize the stoker only when the second pair of said room thermostat contacts and said second pair of contacts of the temperature sensitive unit are engaged, and a second temperature sensitive unit also responsive to the temperature of the medium heated by said furnace, said second temperature sensitive unit being normally responsive to a range of temperature lower than the range of temperature to which said first unit is responsive and including means serving as a pair of contacts disposed in series with one of the pairs of room thermostat contacts and one of the pairs of contacts of said first temperature sensitive means, whereby neither the room thermostat nor said first temperature sensitive means can actuate said relay to energize said stoker unless said pair of contacts of said second temperature sensitive unit are in engagement.

4. Control means for an automatic burner for furnaces and the like having a medium heated by combustion of the fuel fed to the furnace, said control means comprising energizing means for actuating the burner, a temperature sensitive unit responsive to the temperature of said medium and including means serving as two pairs of contacts, the engagement of one pair serving to start up said energizing means and the engagement of the other pair serving to deenergize said means to stop the delivery of fuel to the furnace, said first pair of contacts being adapted to be engaged when the temperature of said medium falls to a given value and said second pair of contacts being brought into engagement when the temperature of said medium rises to a given value, and a second temperature sensitive unit responsive to the temperature of said medium and also including two pairs of contacts, the first pair of contacts thereof being disposed in serial arrangement with said first pair of contacts of said first temperature sensitive unit, whereby said burner is not energized unless both of said first pairs of contacts are in engagement, said second temperature sensitive unit being arranged to bring said first pair of contacts thereof into engagement when the temperature of said heating medium is above a given value lower than said first mentioned lower temperature value, the second pair of contacts of said second temperature sensitive unit being brought into engagement when the temperature falls below said lower value and arranged to deenergize said burner.

5. Control means for an automatic burner for a furnace or the like, comprising energizing means for activating said burner, and means responsive to furnace temperature and including a first unit serving as two pairs of contacts, the engagement of one pair serving to start up said energizing means and the engagement of the other pair serving to deenergize said means to stop the delivery of fuel to the furnace, said first pair of contacts being adapted to be engaged when the furnace temperature falls to a given value and said second pair of contacts being brought into engagement when the furnace temperature rises to a given value, and a second unit also having means serving as two pairs of contacts, the first pair of contacts thereof being disposed in serial arrangement with said first pair of contacts of said first unit, whereby said burner is not energized unless both of said first pairs of contacts are in engagement, said second unit being arranged to bring said first pair of contacts thereof into engagement when the furnace temperature is above a given value lower than said first mentioned lower temperature value, the second pair of contacts of said second unit being brought into engagement when the temperature falls below said lower value and arranged to deenergize said burner.

6. Control means for an automatic burner for furnaces and the like having a medium heated by combustion of the fuel fed to the furnace, said control means comprising energizing means for actuating the burner, a room thermostat movable into low and high temperature positions, a temperature sensitive unit responsive to the temperature of said medium and including means serving as two pairs of contacts, the engagement of one pair serving to start up said energizing means and the engagement of the other pair serving to deenergize said means to stop the delivery of fuel to the furnace when the room temperature is in its high temperature position, said first pair of contacts being adapted to be engaged when the temperature of said medium falls to a given value and said second pair of contacts being brought into engagement when the temperature of said medium rises to a given value, and a second temperature sensitive unit responsive to the temperature of said medium and also including means serving as two pairs of contacts, the first pair of contacts thereof being disposed in serial arrangement with said first pair of contacts of said first temperature sensitive unit, whereby said burner is not energized unless both of said first pairs of contacts are in engagement, said second temperature sensitive unit being arranged to bring said first pair of contacts thereof into engagement when the temperature of said heating medium is above a given value lower than said first mentioned lower temperature value, the second pair of contacts of said second temperature sensitive unit being brought into engagement when the temperature falls below said lower value and arranged to deenergize said burner.

7. Control means for an automatic burner for furnaces and the like having a medium heated by combustion of the fuel fed to the furnace, said control means comprising energizing means for actuating the burner, a room thermostat movable into low and high temperature positions, a temperature sensitive unit responsive to the temperature of said medium and including means serving as two pairs of contacts, the engagement of one pair serving to start up said energizing means if the room thermostat is in its low temperature position, and the engagement of the other pair serving to deenergize said means to stop the delivery of fuel to the furnace, said first pair of contacts being adapted to be engaged when the temperature of said medium falls to a given value and said second pair of contacts being brought into engagement when the temperature of said medium rises to a given value, and a second temperature sensitive unit responsive to the temperature of said medium and also including means serving as two pairs of contacts, the first pair of contacts thereof being disposed in serial arrangement with said first pair of contacts of said first temperature sensitive unit, whereby said burner is not energized unless both of said first pairs of contacts are in engagement, said second temperature sensitive unit being arranged to bring said first pair of contacts thereof into engagement when the temperature of said heating medium is above a given value lower than said first mentioned lower temperature value, the second pair of contacts of said second temperature sensitive unit being brought into engagement when the temperature falls below said lower value and arranged to deenergize said burner, provided said first pair of contacts of said first temperature sensitive unit are in engagement.

CY WEDGE.